United States Patent [19]

Glover et al.

[11] Patent Number: 4,824,877

[45] Date of Patent: Apr. 25, 1989

[54] HIGH POLYMER CONTENT SILICONE EMULSIONS

[75] Inventors: Shedric O. Glover; Daniel Graiver, both of Midland, Mich.

[73] Assignee: Dow Corning Corporation, Midland, Mich.

[21] Appl. No.: 151,686

[22] Filed: Feb. 2, 1988

[51] Int. Cl.$^4$ .............................................. C08L 53/04
[52] U.S. Cl. ..................................... 523/221; 524/588
[58] Field of Search .......................... 523/221; 528/588

[56] References Cited

U.S. PATENT DOCUMENTS

| | | | |
|---|---|---|---|
| 3,294,725 | 12/1966 | Findlay et al. | 260/29.2 |
| 3,433,780 | 3/1969 | Cekada et al. | 260/29.2 |
| 3,975,294 | 8/1976 | Dumoulin | 252/354 |
| 4,052,331 | 10/1977 | Dumoulin | 252/312 |
| 4,146,499 | 3/1979 | Rosano | 252/186 |
| 4,221,688 | 9/1890 | Johnson et al. | 525/119 |
| 4,244,844 | 1/1981 | Molinier et al. | 428/391 |
| 4,244,849 | 1/1981 | Saam | 525/477 |
| 4,620,878 | 11/1986 | Gee | 252/312 |

OTHER PUBLICATIONS

U.S. Patent Application Ser. No. 809,090.

*Primary Examiner*—Morton Foelak
*Attorney, Agent, or Firm*—Edward C. Elliott

[57] ABSTRACT

A polydiorganosiloxane emulsion having a combination of high polymer content and low viscosity can be produced by blending a high polymer content polydiorganosiloxane macroemulsion, having a polymer content of greater than 60 percent by weight and an average particle size of greater than 0.14 micrometers, and a high polymer content polydiorganosiloxane microemulsion, having a polymer content of from 20 to 30 percent by weight and an average particle size of less than 0.14 micrometers, with the ratio of the average particle size of the macroemulsion to the average size of the microemulsion of from 5 to 15.

4 Claims, No Drawings

HIGH POLYMER CONTENT SILICONE EMULSIONS

BACKGROUND OF THE INVENTION

1. Field of the Invention

This invention relates to the use of silicone microemulsions in conjunction with silicone macroemulsions to produce high polymer content emulsions of lower than normal viscosity.

2. Background Information

Findley and Weyenberg developed methods of forming stable polymeric emulsions from siloxane oligomers. Their methods are taught in U.S. Pat. No. 3,294,725, issued Dec. 27, 1966.

Johnson et al. developed a silicone emulsion which gave an elastomeric product upon removal of the water, as shown in U.S. Pat. No. 4,221,688, issued Sept. 9, 1980. The dispersed phase comprised an anionically stabilized hydroxylated polydiorganosiloxane and a colloidal silica.

Another aqueous silicone emulsion is described in U.S. Pat. No. 4,244,849, issued Jan. 13, 1981, which provides an elastomeric product upon removal of the water under ambient conditions. The dispersed phase is a graft copolymer of a hydroxyl endblocked polydiorganosiloxane and an alkali metal silicate.

Emulsions having particle sizes in the range of below 0.1 micrometers (1000 Angstroms) have been developed.

Cekada and Weyenberg prepared colloidal suspensions of silsesquioxanes by adding silane to a water-surfactant mixture with agitation, at a slow rate as described in U.S. Pat. No. 3,433,780, issued Mar. 18, 1969.

A surface active composition which may be used as an emulsifier with diorganopolysiloxanes to form transparent microemulsions or transparent gels is described in U.S. Pat. No. 3,975,294, issued Aug. 17, 1976 and in U.S. Pat. No. 4,052,331, issued Oct. 4, 1977.

A unique method for the preparation of oil-in-water microemulsions is described in U.S. Pat. No. 4,146,499, issued Mar. 27, 1979. The four step process uses two different surfactants which are selected based upon their solubility in the oil phase and in the water phase.

A method of preparing polyorganosiloxane emulsions having small particle size is taught in U.S. Pat. No. 4,620,878, issued Nov. 4, 1986. A translucent oil concentrate is prepared by mixing a polar group containing polyorganosiloxane, surfactant and water. The concentrate is then rapidly dispersed in water to form a microemulsion with an average particle size of less than 0.14 micrometers.

Graiver and Tanaka developed methods of making stable silicone microemulsions by emulsion polymerization. Their methods are taught in U.S. application Ser. No. 809,090, filed Dec. 12, 1985.

In any of these methods, as the solids content of the emulsion is raised, the viscosity of the emulsion rises. For applications which require a flowable emulsion, the rise in viscosity limits the polymer content which can be achieved.

SUMMARY OF THE INVENTION

An emulsion of polydiorganosiloxane having a high polymer content and yet a relatively low viscosity is produced by blending 100 parts by weight of a polydiorganosiloxane macroemulsion having a high polymer content with from 1 to 70 parts by weight of a polydiorganosiloxane microemulsion having a high polymer content.

DESCRIPTION OF THE INVENTION

This invention relates to a method of producing a polydiorganosiloxane emulsion having a high polymer content of greater than 40 percent by weight and a relatively low viscosity of less than 25 Pa.s at 25° C. comprising. mixing 100 parts by weight of a high polymer content polydiorganosiloxane macroemulsion having a polymer content of greater than 60 percent by weight and particle diameters greater than 0.14 micrometers with from 1 to 70 parts by weight of a high polymer content polydiorganosiloxane microemulsion having a polymer content of from 20 to 30 percent by weight and particle diameters less than 0.14 micrometers, with the ratio of the average particles size of the macroemulsion to the average particle size of the microemulsion being from 5 to 15 and the particle size distribution of each of the parent emulsions being broad.

A high polymer content polydiorganosiloxane macroemulsion is defined as one in which the polymer phase of the emulsion comprises greater than 60 percent by weight of the total weight of the emulsion. The emulsion has a high viscosity under zero shear, such as a viscosity of greater than 25 Pa.s at 25° C. An emulsion having a viscosity of greater than 25 Pa.s is such that it becomes difficult to work with in normal plant mixing equipment such as stirred mixing kettles and in pumping through pipes during transfer of the emulsion to other processing equipment or to storage containers. The preferred polymer content is from 60 to 80 percent by weight. A macroemulsion is one that has particles which scatter appreciable amounts of light. The average diameter of the emulsion particles exceeds 0.14 micrometers. Preferably the particles exceed diameters of greater than 0.25 micrometers with a preferred range of 0.25 to 0.5 micrometers. The high polymer content polydiorganosiloxane macroemulsion can be prepared by any of the methods known. Examples of macroemulsions are found in U.S. Pat. Nos. 3,294,725, 4,221,688, 4,244,844, and 4,244,849, all of which are hereby incorporated by reference to show polydiorganosiloxane macroemulsions and means for their preparation.

The high polymer content polydiorganosiloxane macroemulsion is preferably prepared by following the method found in U.S. Pat. No. 3,294,725. An organosiloxane is polymerized while in the dispersed state in an aqueous medium in the presence of a surface active sulfonic acid. The siloxane and surface active sulfonic acid catalyst are dispersed in water to form a stable emulsion. The emulsion is then allowed to stand with or without agitation at the desired temperature until the siloxane has reached the desired state of molecular aggregation.

A high polymer content polydiorganosiloxane microemulsion is an emulsion having from 20 to 30 percent by weight polymer phase based upon the total weight of the emulsion. The emulsion particles do not exceed diameters of 0.14 micrometers. Preferred are emulsions having particle diameters of less than 0.1 micrometers, with diameters of less than 0.05 micrometers most preferred.

The high polymer content polydiorganosiloxane microemulsion can be prepared by following the methods found in U.S. Pat. Nos. 3,433,780, 3,975,294, 4,052,331, 4,146,499, and 4,620,878, all of which are hereby incorporated by reference to show methods of producing microemulsions and the microemulsions.

A microemulsion of polydiorganosiloxane may be prepared by sequentially adding precursor emulsion comprised of cyclopolydiorganosiloxane, surfactant, and water to a polymerization medium comprised of water and an effective amount of a polymerization catalyst, while mixing, wherein the rate of addition of the precursor emulsion is effective to form a clear, stable microemulsion which has polydiorganosiloxane droplets of less than 0.14 micrometer in diameter, and which contains a surfactant to polydiorganosiloxane weight ratio of 0.15 to 0.65. That is, the weight of surfactant divided by the weight of polymer is between 0.15 and 0.65.

The macroemulsion and the microemulsion used in this invention can be of the cationic, anionic, or nonionic types. The emulsions can be the normal mechanical emulsions which are formed by intense shear of a mixture of polymer, surfactant, and water, or they can be of the type where the polymer is prepared in emulsion form. The important point is that the ratio of the average size of the macroemulsion particles to the average size of the particles of the microemulsion is in the range of from 5:1 to 15:1 with a range of about 10:1 preferred. Ideally, each of the parent emulsions should have a highly polydispersed particle size distribution. Since the purpose of the mixtures of this invention is to produce a high polymer content emulsion with a low viscosity, the viscosity of the macroemulsion must be high enough to be of concern. The polymer content of the macroemulsion has to be high enough such that the dispersed phase creates enough surface area to create significant interference to flow of the continuous phase, thus creating a high viscosity. This depends upon several factors including the average particle diameter and the distribution of the particle diameters. Thus, when a combination of average particle size and polymer content of a macroemulsion leads to a higher viscosity than is desired by the user, a lower viscosity emulsion can be made by diluting the macroemulsion with a microemulsion. For example, a silicone emulsion having a mean diameter in the 0.3 to 0.4 micrometer range and a polymer content in the range of 62 percent has a viscosity such that the emulsion is non-flowing or very slowly flowing when at rest or under low shear. By adding a portion of a microemulsion to such a macroemulsion a new emulsion is formed which has a much lower viscosity.

The polydiorganosiloxane emulsion of this invention, having a high polymer content and a relatively low viscosity, is produced by mixing one of the emulsions slowly into the other emulsion with stirring. This blending two emulsions with large differences in the particle mean diameters and particle size distributions creates an emulsion with a bimodal particle size distribution. As shown in Table I, a high viscosity macroemulsion and a high viscosity microemulsion, when combined in this manner can give a viscosity much lower than that of either one alone. The mixture of 470 Pa.s (470,000 cps) viscosity macroemulsion and 1,900 Pa.s (1,900,000 cps) microemulsion gave a mixture having a viscosity of only 23 Pa.s (23,000 cps), while maintaining a high solids content in the final emulsion.

The emulsions of this invention are particularly useful in applications where a high polymer content in combination with a low viscosity, at low shear rates, are desirable. These emulsions can be used as coatings which will flow out to a smooth surface, yet give a good coating because of the high polymer content. By the addition of fillers, it is possible to produce emulsions having a viscosity like a paste for use as sealants which can be extruded from a storage tube and yet have very little shrinkage on drying because of the high polymer content; i.e. low volatility content.

The method of this invention enables a manufacturer to use high polymer content, high viscosity macroemulsions in a plant in a practical manner. For example, by putting a microemulsion, having a viscosity of less than 25 Pa.s for example, into a mixing kettle first and then pumping a high viscosity macroemulsion into the kettle with stirring, the viscosity of the mixture in the kettle remains low, below 25 Pa.s. Since the high polymer content macroemulsion can approach a non-flowing material when at rest, this procedure allows the production of emulsions having both high polymer content and low viscosity at the same time.

The following examples are included for illustrative purposes only and should not be construed as limiting the invention which is properly set forth in the appended claims. All parts are parts by weight.

EXAMPLE 1

A high polymer content polydiorganosiloxane macroemulsion was prepared by first combining 3 parts of surfactant (WAQE, a 30 percent dispersion of sodium lauryl sulphate in water) with 22 parts of distilled water. Then 75 parts of hydroxyl endblocked polydimethylsiloxane having a viscosity of about 0.08 Pa.s at 25° C. was slowly added with stirring. After all of the polydiorganosiloxane was added, the crude dispersion was homogenized twice at 6000 psi in a single stage laboratory homogenizer. The resultant emulsion was a stable emulsion having a polymer content of 75.9 percent and an average particle size of about 0.35 micrometers. Its viscosity was about 470 Pa.s (470,000 cps) at a shear rate of 1 reciprocal second.

A high polymer content polydiorganosiloxane microemulsion was prepared by first combining 7.5 parts of dodecylbenzenesulfonic acid and 142.5 parts of water, then slowly admixing 100 parts of dimethylcyclosiloxane and homogenizing twice at 7500 psi to form a macroemulsion of the dimethylcyclosiloxane(emulsion A). A microemulsion was then formed by slowly adding 100 parts of macroemulsion A to a reaction flask containing 88 parts of water and 12 parts of dodecylbenzenesulfonic acid which was heated to 85° to 90° C. and polymerizing for a sufficient time to form a polymer microemulsion (emulsion a) having a polymer content of about 20 percent by weight and an average particle size of about 0.03 micrometers. The viscosity of this emulsion was about 1,900 Pa.s (1,900,000 cps) at a shear rate of 1 reciprocal second.

A similar high polymer content polydiorganosiloxane microemulsion was prepared by a similar process to give a microemulsion (b) of about 30 percent by weight polymer and an average particle size of about 0.05 micrometers. Its viscosity was about 2,000 Pa.s (2,000,000 cps) at a shear rate of 1 reciprocal second.

A series of mixtures were prepared by mixing sufficient diluent into the macroemulsion described above to lower the polymer content from 75 percent to 70.5 percent. The diluents were distilled water, distilled water with 10 percent sodium lauryl sulphate added, microemulsion (a), and microemulsion (b). The viscosity of each mixture was then measured at a shear rate of 1 reciprocal second with the results shown in Table 1.

TABLE 1

| Diluent | Amount parts | | Polymer percent | Viscosity Pa.s |
|---|---|---|---|---|
| | diluent | macroemulsion | | |
| none | 0 | 75.0 | 75.0 | 470 |
| water | 3.19 | 46.8 | 70.5 | 80 |
| water + surfactant | 3.19 | 46.8 | 70.5 | 47 |
| microemulsion (a) | 4.1 | 45.9 | 70.5 | 23 |
| microemulsion (b) | 5.0 | 45.0 | 70.5 | 17 |

This shows the result of mixing a minor amount of a microemulsion having a viscosity of about 2,000 Pa.s (2,000,000 cps) into a macroemulsion having a viscosity of about 500 Pa.s (500,000 cps). All of these emulsions were non-flowing before mixing. After addition of the microemulsion, the resulting emulsion mixture was very fluid.

EXAMPLE 2

The macroemulsion of Example 1 was a nonflowing material when it was not under shear. Microemulsion (a) of Example 1 was a nonflowing material when not under shear. When 5 parts of microemulsion (a) was mixed into 95 parts of the macroemulsion, the mixture was an easily flowing material.

EXAMPLE 3

A crude emulsion was prepared by weighing 352.31 g (19.573 moles) of distilled, deionized water into a beaker and 45.19 g of 1.04 molar solution of sodium dodecyl sulfate was added and mixed with a stirrer until homogeneous. Then 1102.5 g (0.402 moles) of hydroxyl endblocked polydimethylsiloxane having a viscosity of about 0.08 Pa.s was slowly added and stirred at high speed for 30 minutes.

This crude emulsion was homogenized by passing 2 times through a laboratory single stage homogenizer at 6000 psi. The macroemulsion was about 76 percent polymer content and had an average particle size of about 0.35 micrometers. The viscosity of the emulsion was 519 Pa.s at a shear rate of 0.1380 reciprocal seconds.

A microemulsion was prepared by first making a macroemulsion, then converting it to a microemulsion.

A macroemulsion using a cyclic polydiorganosiloxane was prepared by adding 570 g (31.76 moles) of distilled, deionized water to a beaker and mixing in 30 g (0.861 mole) of dodecylbenzenesulfonic acid and mixing until a homogenous solution was obtained. Then 400 g (1.3514 moles) of octamethylcyclotetrasiloxane was added and stirred for 30 minutes. This mixture was then homogenized by passing twice through a single stage laboratory homogenizer to give an emulsion having an average particle size of about 0.23 micrometers and a polymer contents of about 40 percent by weight.

A microemulsion was then prepared by first adding 539.5 g (29.97 moles of distilled, deionized water to a reaction flask and mixing in 110.5 g (0.3171 mole) of dodecylbenzenesulfonic acid, then raising the temperature to 90° C. Then 650 g of the above prepared macroemulsion was slowly added to the reaction flask via a dropping funnel at a rate which maintained a clear, transparent emulsion. Once the addition was complete, the reaction was allowed to continue for 1 hour, at which time the flask was cooled and the emulsion bottled. The microemulsion contained 20 weight percent polymer, had an average particle size of about 0.05 micrometers, and a viscosity of about 1,927 Pa.s at 25° C.

The grams of macroemulsion and grams of microemulsion shown in Table II were then mixed together, deaired, and sheared at a low shear rate. The viscosity of each sample was then measured at a shear rate of 0.1380 reciprocal seconds with the results shown in Table II.

TABLE II

| Sample | Macroemulsion gm | Microemulsion | | Viscosity Pa.s |
|---|---|---|---|---|
| | | gms | Wt % | |
| 1 | 20.0 | 0 | 0 | 519 |
| 2 | 19.5 | 0.5 | 2.5 | 121 |
| 3 | 19.0 | 1.0 | 5.0 | 110 |
| 4 | 18.0 | 2.0 | 10.0 | 29 |
| 5 | 16.0 | 4.0 | 20.0 | 12 |
| 6 | 12.0 | 8.0 | 40.0 | 9 |
| 7 | 8.0 | 12.0 | 60.0 | 20 |
| 8 | 4.0 | 16.0 | 80.0 | 578 |
| 9 | 0.0 | 20.0 | 100.0 | 1,927 |

That which is claimed is:

1. A method of producing a polydiorganosiloxane emulsion having a high polymer content of greater than 40 percent by weight and a relatively low viscosity of less than 25 Pa.s at 25° C. comprising, mixing 100 parts by weight of a high polymer content polydiorganosiloxane macroemulsion having a polymer content of greater than 60 percent by weight and particle diameters greater than 0.14 micrometers with from 1 to 70 parts by weight of a high polymer content polydiorganosiloxane microemulsion having a polymer content of from 20 to 30 percent by weight and particle diameters less than 0.14 micrometers. with the ratio of the average particle size of the macroemulsion to the average particle size of the microemulsion being from 5 to 15 and the particle size distribution of each of the parent emulsions being broad.

2. The method of claim 1 in which the macroemulsion is from 60 to 80 percent by weight poymer and has an average particle size of greater than 0.25 micrometers.

3. The method of claim 1 in which the microemulsion has particle diameters of less than 0.1 micrometers.

4. The method of claim 1 in which the macroemulsion is a polydimethylsiloxane emulsion of from 60 to 80 percent by weight polymer and has an average particle size of from 0.25 to 0.5 micrometers, the microemulsion is from 1 to 50 parts by weight of polydimethylsiloxane emulsion having from 20 to 30 percent by weight polymer and particle diameters less than 0.05 micrometers with the resulting polydiorganosiloxane emulsion having a polymer content of greater than 60 percent by weight and a viscosity of less than 25 Pa.s at 25° C.

* * * * *